(12) United States Patent
Peterson et al.

(10) Patent No.: US 6,472,632 B1
(45) Date of Patent: Oct. 29, 2002

(54) METHOD AND APPARATUS FOR DIRECT ELECTROTHERMAL-PHYSICAL CONVERSION OF CERAMIC INTO NANOPOWDER

(75) Inventors: Dennis Roger Peterson, Austin, TX (US); Dennis Eugene Wilson, Austin, TX (US)

(73) Assignee: Nanoscale Engineering and Technology Corporation, Austin, TX (US)

( * ) Notice: Subject to any disclaimer, the term of this patent is extended or adjusted under 35 U.S.C. 154(b) by 0 days.

(21) Appl. No.: 09/396,046

(22) Filed: Sep. 15, 1999

(51) Int. Cl.[7] .............................................. B23K 10/00
(52) U.S. Cl. .............................. 219/121.59; 219/121.47; 219/76.16; 219/121.43; 219/121.52; 427/255.1; 427/255.2
(58) Field of Search ........................ 219/121.47, 76.16, 219/76.15, 121.43, 121.41, 121.59, 121.52; 427/255.1, 255.3, 249, 223, 255.2, 450, 576; 423/325, 246, 345, 440, 625

(56) References Cited

U.S. PATENT DOCUMENTS

| | | |
|---|---|---|
| 3,639,150 A | 2/1972 | Suhara et al. |
| 4,640,180 A | 2/1987 | Rose |
| 4,642,207 A | 2/1987 | Uda et al. |
| 5,128,081 A | 7/1992 | Siegel et al. |

(List continued on next page.)

FOREIGN PATENT DOCUMENTS

| | | |
|---|---|---|
| EP | 0 282 291 A2 | 3/1988 |
| JP | 62120470 | 6/1987 |
| JP | 62273044 | 11/1987 |
| JP | 63100364 | 5/1988 |
| JP | 63199470 | 8/1988 |
| JP | 63199471 | 8/1988 |
| SU | 1727922 A | 4/1992 |
| WO | WO/96/06700 | 8/1995 |
| WO | PCT/US00/25163 | 9/2000 |
| WO | WO 01/20953 A1 | 3/2001 |

OTHER PUBLICATIONS

U.S. patent application Ser. No. 09/661,330, Peterson et al., filed Sep. 13, 2000.

U.S. patent application Ser. No. 09/695,465, Peterson et al., filed Oct. 24, 2000.

Bourham, M.A.; Gilligan, J.G.; Hankins, O.E.; *Plasma–Material Interaction in Electrothermal and Electromagnetic Launchers*, American Institute of Aeronautics and Astronautics, Inc., Washington, D.C., 1993.

Raja, L.L.; Varghese, P.L.; Wilson, D.E.; *Modeling of the Electrogun Metal Vapor Plasma Discharge*; Journal of Thermophysics and Heat Transfer, vol. 11, No. 3, Jul.–Sep. 1997, pp. 353–360.

*Primary Examiner*—Teresa Walberg
(74) *Attorney, Agent, or Firm*—Bracewell & Patterson, L.L.P.

(57) ABSTRACT

A method of producing nanocrystalline ceramic powder by creating a plasma stream in a reactor vessel, and physically converting a ceramic precursor material into ceramic particles suspended in the vessel, using the plasma stream. A metallic reactant may additionally be introduced into the vessel using the plasma stream, wherein the metallic reactant forms ceramic particles having the same composition as the ceramic particles of the physical converting step. The plasma stream is created using an electrothermal gun. The gun may use a ceramic barrel which is eroded by the plasma stream. Alternatively (or additionally), the ceramic precursor material may be injected as particulates into the plasma stream, wherein the ceramic precursor particulates are micron-sized or larger. A novel electrothermal gun design may optionally use a replaceable insert constructed of the ceramic precursor material.

16 Claims, 3 Drawing Sheets

U.S. PATENT DOCUMENTS

| | | |
|---|---|---|
| 5,149,381 A | 9/1992 | Grewe et al. |
| 5,355,764 A | 10/1994 | Marinos et al. |
| 5,486,675 A | 1/1996 | Taylor et al. |
| 5,503,081 A | 4/1996 | Lindblom et al. |
| 5,688,417 A | 11/1997 | Cadre et al. |
| 5,770,022 A | 6/1998 | Chang et al. |
| 5,851,507 A * | 12/1998 | Pirzada ........................ 423/659 |
| 5,876,683 A * | 3/1999 | Glumac et al. ............. 423/325 |
| 5,997,956 A * | 12/1999 | Hunt et al. .................. 427/450 |
| 6,132,563 A | 10/2000 | Hunt et al. |

METHOD AND APPARATUS FOR DIRECT ELECTROTHERMAL-PHYSICAL CONVERSION OF CERAMIC INTO NANOPOWDER

BACKGROUND OF THE INVENTION

1. Field of the Invention

The present invention generally relates to a method and system for the production of submicron materials, and more particularly to a method and system of synthesizing, in bulk quantities, nanosized powders, including nanocrystalline ceramics.

2. Description of Related Art

Ceramic materials are used in a wide variety of applications, and generally have excellent heat resistance, corrosion resistance, and abrasion resistance, as well as unique electrical or optical properties. Ceramic material, as used herein, generally refers to an oxide, nitride, boride or carbide of a metal, or a mixture thereof. Very fine ceramic powders are used in a large number of industrial processes to introduce or modify material properties. These materials can pose difficulties in sintering but, when they are converted to ultrafine particles, particularly submicron crystalline particles, numerous traditional problems are avoided. Accordingly, several processes have been devised for fabricating ultrafine, or submicron, crystalline materials, such as those of 1–500 nanometer size, referred to herein as nanosized or nanocrystalline.

Techniques for producing nanocrystalline materials generally fall into one of three categories, namely, mechanical processing, chemical processing, or physical (thermal) processing. In mechanical processes, fine powders are commonly made from large particles using crushing techniques such as a high-speed ball mill. There are several disadvantages with this approach. Sometimes metallic powders and highly reactive metals are combined with and subjected to such milling, which can pollute the material with a nanocrystalline alloy. Fragmented powders produced by mechanical processes can also result in particles of inconsistent shapes and sizes, and are often coarse and so not suited for high-performance applications.

With chemical processes, nanocrystalline materials are created from a reaction that precipitates particles of varying sizes and shapes, using a family of materials known as organometallics (substances containing combinations of carbon and metals bonded together). It is difficult, however, to produce ultrafine ceramics using organometallics without introducing excess carbon, or nitrogen (or both) into the final composition. Solution-gelation (sol-gel) ceramic production is similar to organometallic processes, but sol-gel materials may be either organic or inorganic. Both approaches involve a high cost of raw materials and capital equipment, limiting their commercial acceptance.

One of the earliest forms of physical, or thermal, processing, involves the formation and collection of nanoparticles through the rapid cooling of a supersaturated vapor (gas phase condensation). See, e.g., U.S. Pat. No. 5,128,081. In that example, a raw metallic material is evaporated into a chamber and raised to very high temperatures, and then oxygen is rapidly introduced. See also U.S. Pat. No. 5,851,507, in which a carrier medium is mixed with precursor material which is vaporized and subsequently rapidly quenched.

Thermal processes create the supersaturated vapor in a variety of ways, including laser ablation, plasma torch synthesis, combustion flame, exploding wires, spark erosion, electron beam evaporation, sputtering (ion collision). In laser ablation, a high-energy pulsed laser is focused on a target containing the material to be processed. The high temperature of the resulting plasma (greater than 10,000° K) vaporizes the material so quickly that the rest of the source (any carrier and quenching gases) can operate at room temperature. The process is capable of producing a variety of nanocrystalline ceramic powders on the laboratory scale, but it has the great disadvantage of being extremely expensive due to the inherent energy inefficiency of lasers, and so it not available on an industrial scale.

The use of combustion flame and plasma torch to synthesize ceramic powders has advanced more toward commercialization. In both processes, the precursor material can be a solid, liquid or gas prior to injection into the flame or torch, under ambient pressure conditions. (the most common precursor state is a solid material). The primary difference between the two processes is that the combustion flame involves the use of an oxidizing or reducing atmosphere, while the plasma torch uses an inert gas atmosphere. Each of these processes requires relatively expensive precursor chemicals, such as $TiCl_4$ for the production of $TiO_2$ by the flame process, or TiC and $TiB_2$ by the plasma process. A feature of both methods is the highly agglomerated state of the as-synthesized nanocrystalline ceramic powders. While for many applications the agglomeration of the powders is of little significance, there are situations where it is a shortcoming. Loosely agglomerated nanoparticle powders are produced in the combustion flame method of U.S. Pat. No. 5,876,683.

In the plasma process, reactants (feed materials) are delivered to a plasma jet produced by a plasma torch. See generally, U.S. Pat. Nos. 4,642,207 and 5,486,675. Alternatively, the feed material may be delivered to the plasma stream by arc vaporization of the anode. The anode is normally metallic but may be a metal-ceramic composite.

An improved plasma torch process is described in U.S. Pat. No. 5,514,349. That process can produce non-agglomerated ceramic nanocrystalline powders starting from metalorganic precursors, and uses rapid thermal decomposition of a precursor/carrier gas stream in a hot tubular reactor combined with rapid condensation of the product particle species on a cold substrate. Plasma torch processes, while gaining some limited commercial acceptance, are still energy inefficient and often involve materials which are extraneous to the products being produced. For example, in the '349 patent, a working gas must be heated by the plasma arc, which is wasted energy. Also, since the product particles are suspended in the hot process gas stream, it is necessary to quench not just the particles but the process stream as well. The multiple gases used (the reaction gas, quench gas, and passivating gas) are either wasted, or must be separated for reuse.

A more recent development in vaporizing technology uses an electrothermal gun (electrogun). The electrogun is a pulsed power device which employs an electrode erosion phenomenon to vaporize one of the discharge electrodes (the cathode). The eroded metal vapor is subsequently ionized to form a dense plasma in which the high current discharge is sustained. The electrogun has a small length-to-diameter ratio and is designed to resist bore wall erosion. The vaporized metal exits the electrogun in a high-temperature, high-pressure, high-velocity jet. This jet is directed into a reactor filled with an appropriate atmosphere for reaction of the metal and quenching of the nanoparticles produced. Upon leaving the confines of the gun, the high-pressure jet expands rapidly. This expansion produces rapid cooling which promotes condensation of the vaporized material, thereby forming a spray of high-velocity metallic nanoparticles.

The electrogun uses batch processing powered by high-energy current pulses, while a plasma torch which operates continuously. Electrothermal synthesis, unlike plasma torch, heats the feed material directly, and does not produce any waste stream of process gases. The use of an electrogun is still somewhat energy inefficient, however, since it is necessary to chemically react the raw material to produce the nanoparticles, as opposed to merely physically converting another form of the material. It would, therefore, be desirable to devise a method of synthesizing nanocrystalline ceramics which is more energy efficient, and suitable for an industrial scale. It would be further advantageous if the method could reduce material cost.

SUMMARY OF THE INVENTION

It is therefore one object of the present invention to provide an improved method of producing nanosized ceramic particles.

It is another object of the present invention to provide such a method which is more energy efficient and uses a less expensive precursor material.

It is yet another object of the present invention to provide a method of synthesizing nanocrystalline ceramic powders, wherein the method includes the physical conversion of precursor ceramic material into a nanosized form.

The foregoing objects are achieved in a method of producing ceramic powder, generally comprising the steps of creating a plasma stream in a reactor vessel, and physically converting a ceramic precursor material into ceramic particles suspended in the vessel, using the plasma stream. The plasma stream is directed into an atmosphere of the vessel whose ambient conditions are selected to yield nanocrystalline ceramics. A metallic reactant may additionally be introduced into the vessel using the plasma stream, wherein the metallic reactant forms ceramic particles having the same composition as the ceramic particles of the physical converting step. The plasma stream may be created by delivering electrical current to an electrothermal gun. In one embodiment, the gun has a ceramic barrel which is eroded by the plasma stream. In another embodiment, the ceramic precursor material is injected as particulates into the plasma stream, the ceramic precursor particulates having a first size (e.g., micron or larger), and the ceramic particles suspended in the vessel have a second size which is substantially smaller than the first size (e.g., nanosized). These two embodiments may be combined as well.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
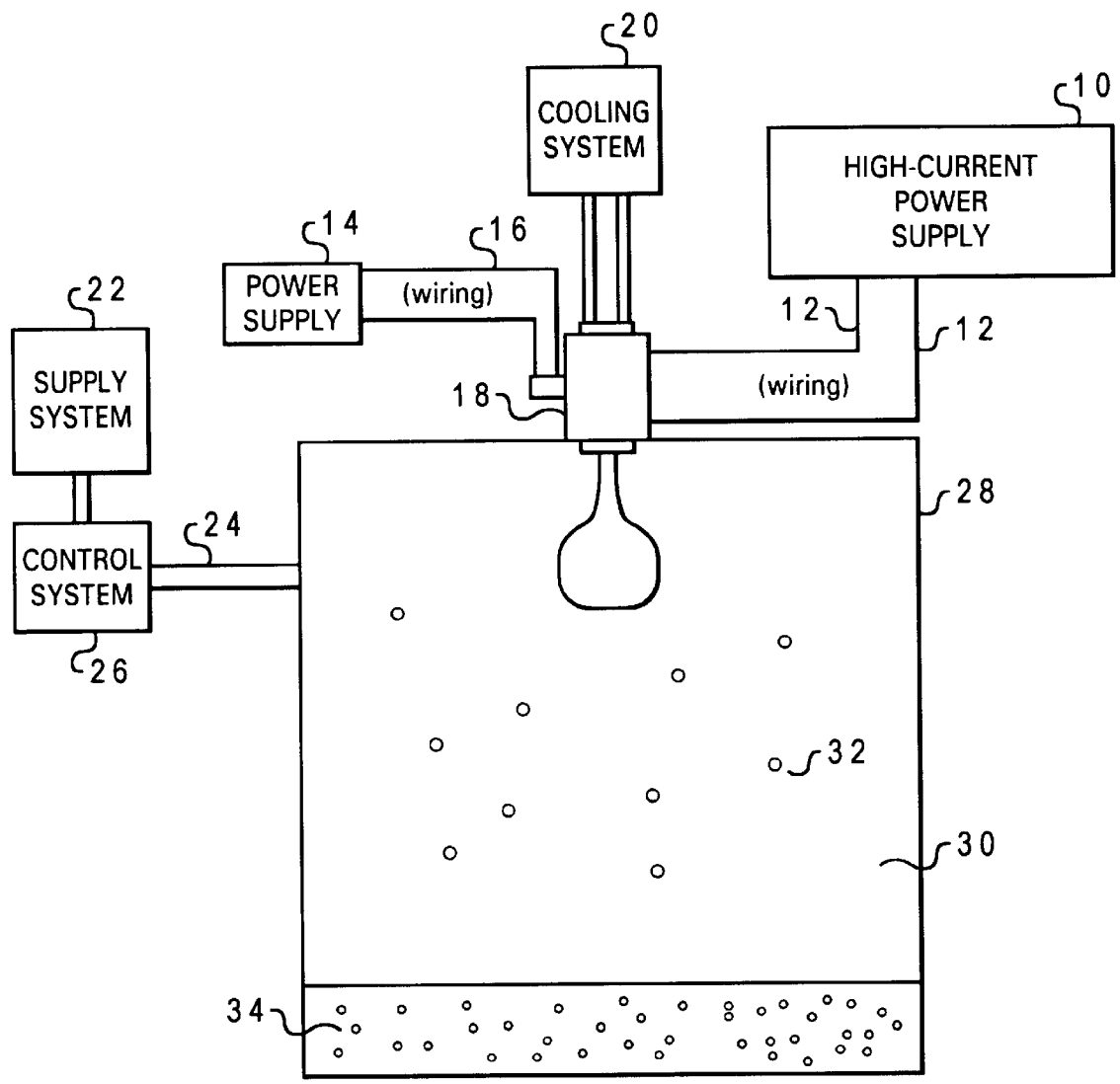
FIG. 1 is a schematic diagram of a system for electrothermal synthesis of nanocrystalline ceramics in accordance with one embodiment of the present invention.

With reference now to the figures, and in particular with reference to FIG. 1, there is depicted one embodiment 8 of an electrothermal system for synthesizing ceramic nanopowders constructed in accordance with the present invention. System 8 is generally comprised of a high-current electrical power supply 10 with heavy-duty wiring 12 for conducting an energetic current pulse, an arc initiator power supply 14 with wiring 16, a ceramic electrothermal gun (electrogun) 18 with a cooling system 20, a reactor atmosphere supply system 22 with a supply pipe 24 and atmosphere control system 26, and a reactor vessel 28 having a reactor atmosphere 30 illustrated with suspended nanoparticles 32, and a layer of settled nanopowder 34 on the floor of the vessel. As explained further below, power supply 10 provides pulsed current to electrogun 18 in concert with initiation of an arc by initiator power supply 14, which results in activation of electrogun 18. A plasma stream from electrogun 18 entrains raw metal precursor material and ceramic precursor material which become vaporized in reactor vessel 28, and subsequently condense as nanocrystalline particles 32.

Figure 2:
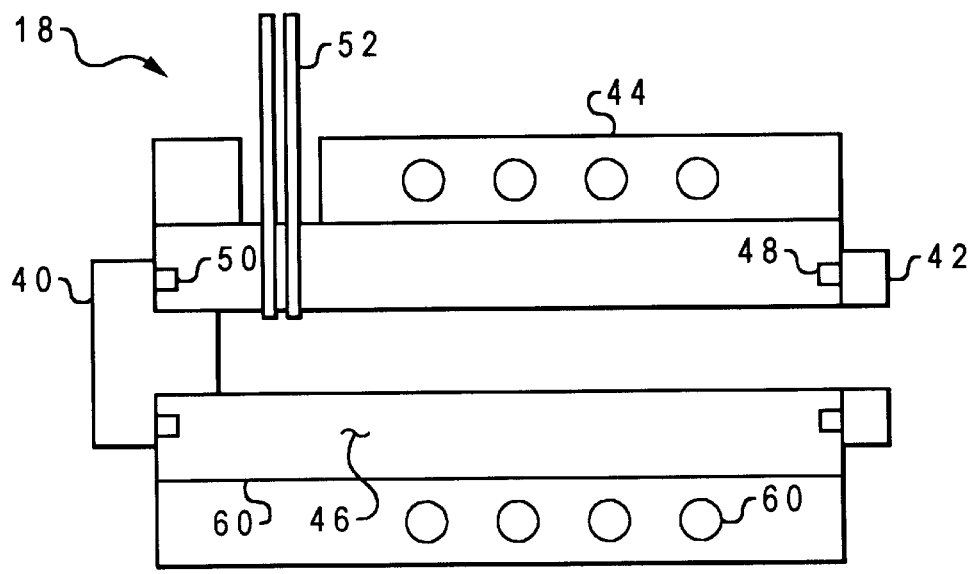
FIG. 2 is a cross-sectional view of an electrothermal gun used with the system of FIG. 1.

Referring now to FIG. 2, electrogun 18 may be constructed in a fashion similar to conventional electrothermal guns (such as those used for spacecraft thrusters, the production of railgun plasma armatures, or the ignition of propellants to accelerate projectiles in guns), except that electrogun 18 is provided with a ceramic barrel, that is, a barrel whose material is the same (chemically, although not in the same physical state) as the nanopowder which is desired to be produced. In the illustrative embodiment, electrogun 18 includes a cathode 40, a non-eroding anode 42, a structural shell or housing 44 with coolant channels 60, a ceramic liner 46 forming the gun barrel, a muzzle seal 48, a breech seal 50, and arc initiator lines 52.

In contrast with prior art electroguns, the material of ceramic liner 46 is specifically selected to erode during generation of the plasma stream within the bore of electrogun 18. The synthesis process thus preferably includes the generation of nanosized particles from both (1) the reaction of the metallic (or organometallic) cathode 40, and (2) the physical conversion of the material of ceramic liner 46 to a nanosized form as a result of the gun blast. In the preferred embodiment, electrogun 18 has a length-to-diameter ratio of at least ten.

Figure 3:
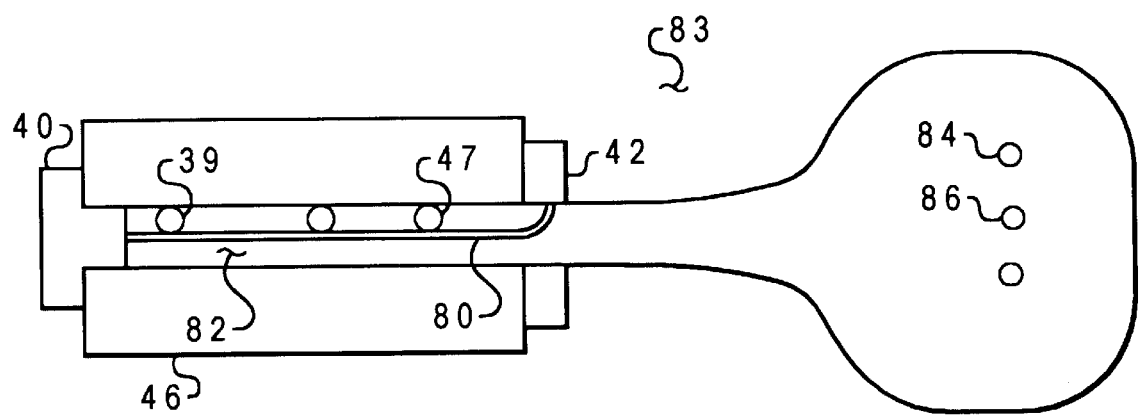
FIG. 3 is a pictorial representation of the synthesis of nanocrystalline ceramic powder using the system of FIG. 1.

The synthesis process is illustrated further in FIG. 3. Power is supplied to cathode/anode pair 40/42 via power supply 10 while an electric arc is established via initiator lines 52. The high-current electric arc 80 passes between cathode 40 and anode 42, and a high-pressure, high-velocity, high-temperature stream of plasma 82 flows down the bore of electrogun 18. Ceramic material 47 is ablated from ceramic liner 46, and become entrained in plasma stream 82. Particles thus entrained lose mass through vaporization, and become smaller or vaporize completely. Reactant material 39 from cathode 40 also becomes entrained in plasma stream 82.

As the high-pressure plasma exits the confines of electrogun 18, it undergoes rapid isotropic expansion. One result of the rapid expansion is a rapid cooling. The cooled plasma then condenses into a high-velocity spray of extremely fine (nanosize) ceramic particles 84. The energetic expansion produces turbulent mixing of the condensed droplets or particles with the reactor atmosphere 83. Any metallic particles 86 produced by electrode erosion or by disassociation of ceramic quickly react with the reactor atmosphere 83, forming ceramic particles 84. Thus, a suspension of nanoparticles is produced, which gradually settle to the floor of the reactor vessel where they may be collected.

The reactor atmosphere serves two primary purposes, to react any metal particles which may be mixed in with the ceramic particles, and to rapidly quench the ceramic particles, since unquenched particles would tend to bond tightly together or even grow together into a single particle. Quenched particles may stick together, but more loosely than hot particles. Quenched particles do not tend to grow into a single particle.

Accordingly, the electrothermal synthesis taught herein provides a method for the direct and efficient conversion of ceramic material into ceramic nanopowder, thereby realizing a material cost saving in comparison to competing methods. Energy costs are also reduced inasmuch as the ceramic feed material is heated directly rather than indirectly as is the case of prior art plasma torch processes. The present invention, unlike plasma torch processes, requires no working gas. There is no mixing of gas streams, and no circulation of the reactor atmosphere through the plasma arc, and further there is no need to use a refrigerated quenching surface. Reactions go to completion in less than a millisecond. The technique has proven particularly suitable for production of titanium and aluminum oxide and nitride. No byproducts are produced, and the process is well-suited for automation.

Figure 4:
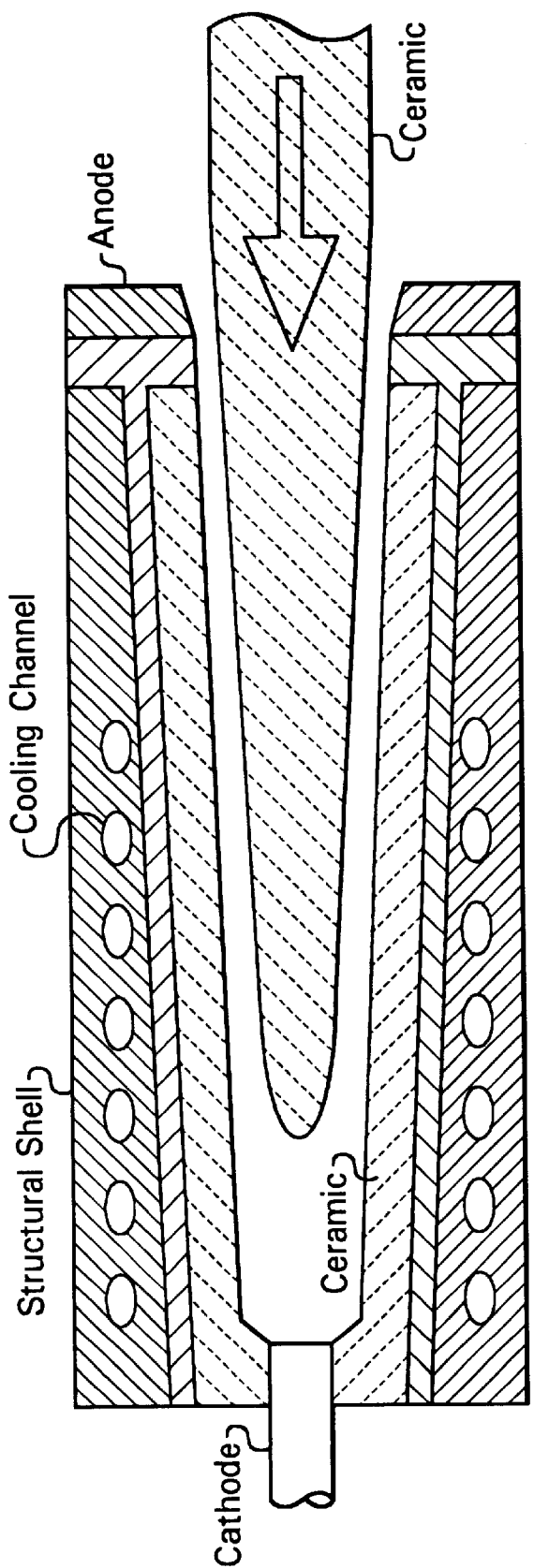
FIG. 4 is a cross-sectional view of an alternative electrothermal gun for use with the present invention.

FIG. 4 illustrates an alternative embodiment for an electrogun 70 which may be used with the present invention. Electrogun 70 has a conical, rather than cylindrical, bore. Additionally, a ceramic insert 72 having a cylindrical body 74 and a conical tip 76 is advanced into the bore. The conical bore and conical tip 76 form a divergent annular passageway. Ceramic material which is to be physically converted to nanopowder is extracted from both the ceramic bore liner and insert 72. In this manner, the insert is easily changed when it as been consumed (i.e., it is used for more than one shot of electrogun 70). The replacement of insert 72 is particularly advantageous since it is more easily eroded that the bore liner, and the liner is less conveniently replaced. The cross-sectional area of the annular passageway is easily adjusted by changing the axial (longitudinal) position of the insert, so simple adjustments compensate for erosion of the conical bore liner as well (to maintain a particular passageway cross-section). Erosion of the passageway is actually self-adjusting, since erosion will be greater where the passageway is smaller, and vice-versa. Physical properties of the insert can be adjusted to favor erosion of the insert. For example, it can be made relatively porous.

In another embodiment, the ceramic precursor material may be injected as particulates into the plasma stream, wherein the ceramic precursor particulates have a first size (e.g., micron or larger), and the ceramic particles suspended in the vessel have a second size which is substantially smaller than the first size (e.g., nanosized). The precursor material would preferably be injected radially in the breech region, allowing sufficient residence time within the gun. The injection technique may be combined with the above-described technique using the ceramic liner 46 which erodes during generation of the plasma stream.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the description refers to an eroding cathode, the current flow could be reversed and an eroding anode (muzzle electrode) provided instead. When the muzzle electrode is eroded, the geometry of the muzzle electrode is designed to interact with and be ablated by the flow of plasma. In contrast, the muzzle electrodes of prior art electroguns are designed to avoid interaction with the plasma so that their muzzle electrodes are not eroded. For example, as shown in FIGS. 2 and 3 of the present invention, the muzzle electrode 42 has a cylindrical bore with a rectangular cross-sectional profile. The inner diameter of the bore of muzzle electrode 42 is substantially flush (e.g., radially aligned and axially aligned) with the inner diameter of barrel 46. This geometry contiguously extends an axial length of the cylindrical barrel 46 by an axial dimension of the bore of muzzle electrode 42. Furthermore, other gun geometries might be used. It is therefore contemplated that such modifications can be made without departing from the spirit or scope of the present invention as defined in the appended claims.

What is claimed is:

1. A method of producing nanosized powder, comprising the steps of:
   providing an electrothermal gun with a barrel, a breech electrode, a muzzle electrode, a reactor atmosphere adjacent to the muzzle electrode, and wherein the electrodes are electrically insulated;
   applying a voltage between the electrically insulated electrodes prior to initiating an ionizing arc between the electrodes;
   creating a plasma stream from a precursor material originating from at least one of the barrel and the muzzle electrode; and
   converting the plasma stream into nanosized particles in the reactor atmosphere.

2. The method of claim 1 wherein said providing step includes the step of forming the barrel with a ceramic liner, and wherein said creating step includes ablating the ceramic liner.

3. The method of claim 1 wherein the creating step comprises introducing a metallic reactant from the muzzle electrode, wherein the reactor atmosphere interacts with the metallic reactant to form nanosized particles.

4. The method of claim 1 wherein said applying step includes the step of initiating the arc without a fuse.

5. The method of claim 1 further comprising the step of injecting additional precursor material as particulates into the plasma stream.

6. The method of claim 1 wherein:
   said providing step includes the step of positioning the muzzle electrode such that the plasma stream interacts with and ablates the muzzle electrode.

7. A system for producing nanosized powder, comprising:
   an electrothermal gun having a barrel with electrically insulated breech and muzzle electrodes, the barrel comprising a first precursor material, and the muzzle electrode comprising a second precursor material;
   a reactor vessel adjacent to the muzzle electrode;
   means for applying a voltage to the electrically insulated electrodes prior to initiating an ionizing arc between the electrodes; wherein a plasma stream is created directly from at least some of the precursor material and nanosized particles are produced from the plasma stream in said reactor vessel.

8. The system of claim 7 wherein the barrel comprises a ceramic liner that is ablated by the plasma stream.

9. The system of claim 7 wherein the second precursor material comprises a metallic reactant that interacts with an atmosphere in the reactor vessel to form nanosized particles.

10. The system of claim 7 wherein a fuse is not required between the electrodes.

11. The system of claim 7, further comprising particulate precursor material in the barrel for conversion into nanosized particles.

12. The system of claim 11 wherein the muzzle electrode has a bore that is substantially aligned with the barrel such that the plasma stream interacts with and ablates the muzzle electrode.

13. A method of producing nanosized particles, comprising the steps of:
- providing breech electrode, a muzzle electrode, an insulated barrel between the electrodes, and a reactor atmosphere adjacent to the muzzle electrode;
- applying a voltage between the electrically insulated electrodes prior to initiating an ionizing arc between the electrodes;
- creating a plasma stream directly from a precursor material by ablating the muzzle electrode; and
- converting the plasma stream into nanosized particles in the reactor atmosphere.

14. The method of claim 13 wherein the applying step includes the step of passing the arc through a gaseous atmosphere of the barrel.

15. A system for producing nanosized particles, comprising:
- a barrel with a breech electrode and a muzzle electrode;
- a reactor vessel adjacent to the muzzle electrode;
- a first state wherein the electrodes are electrically insulated when no power is applied between the electrodes;
- a second state wherein the electrodes are electrically connected when a voltage is applied between the electrodes prior to initiating an ionizing arc to create a plasma stream; and wherein
- the plasma stream interacts with an atmosphere in the reactor vessel to convert the plasma stream into nanosized particles.

16. The system of claim 15 wherein the muzzle electrode and the barrel are ablated to sustain the plasma stream.

* * * * *